March 29, 1960

J. A. MERRITT 2,930,634

COUPLER AND METHOD OF JOINING CONDUITS

Filed Feb. 21, 1957

INVENTOR.
JAMES A. MERRITT
BY
Townsend and Townsend
ATTORNEYS

United States Patent Office 2,930,634
Patented Mar. 29, 1960

2,930,634

COUPLER AND METHOD OF JOINING CONDUITS

James A. Merritt, Livermore, Calif., assignor to Coast Manufacturing and Supply Co., Livermore, Calif., a corporation of Delaware Application February 21, 1957, Serial No. 641,753

11 Claims. (Cl. 285—21)

This invention relates to a new and useful improvement in a coupler and to a method of joining conduits.

More specifically, this invention relates to the coupling of pipe sections by application of a coupling member formed of fusible material through application of external heat without resultant deleterious deformation of the pipe body.

A preferred embodiment of the invention relates particularly to the joining of conduit sections made of thermoplastic material by the use of a coupler of thermoplastic material, such as, for example, polyethylene. Reference is made to my copending patent application Serial No. 569,393 filed March 5, 1956 now abandoned, of which the present application is a continuation in part.

A principal object of the invention is to provide a coupler and method of coupling conduit sections which is more rapid and efficient than methods and couplers heretofore employed, does not require the use of special tools and instruments, and further does not require more than average labor skill. Accordingly the present invention is particularly useful in the field where a plurality of sections must be joined together.

The preferred embodiment of the present invention employs a thermoplastic sleeve body, such as polyethylene, which is reinforced by a suitable annular reinforcement which prevents collapse of the coupler and conduit during use. Provision is made for applying heat to the sleeve, preferably by means of a self-contained fuel heat source with heat transfer directed from exteriorly to interiorly of the sleeve body. Under influence of heat, a portion of the plastic coupling in proximity to and circumferentially embracing the end portions of the conduit sections to be joined softens and becomes molten or fluid, in which form the plastic expands or swells.

One of the advantages of the invention is the fact that the heat is applied externally of the sleeve whereby the plastic swells or expands initially and primarily outwardly rather than inwardly, which would tend to reduce the inside diameter of the conduit sections and partially restrict flow therethrough.

The annular reinforcement of the sleeve permits outward expansion of the molten plastic, as above indicated, yet affords sufficient support to the plastic conduit material (which also softens and fuses with the molten sleeve) to prevent collapse or permanent deformation of the conduit sections. Additionally, the reinforcement, although permitting initial and primary outward swelling of the thermoplastic coupling, presents sufficient resistance to such outward expansion or flow that adequate pressure of the molten sleeve is exerted against the conduit end portions to accomplish good fusion between coupler sleeve and conduits.

Another advantage of the present invention is the fact that it is not necessary to accurately square-cut and butt together the two ends of the conduit sections being joined inasmuch as the present invention serves to fuse the coupler to the conduit sections, rather than to fuse the ends of the two sections together.

Another advantage of the present invention is the provision of means in the coupler to accurately locate the two ends of the conduit relative to the fuel source employed to provide heat for fusion of the joint.

One principal use of the present invention is in joining polyethylene conduit sections which are often used in the chemical, agricultural, and related industries. The use of a standard hose clamp is unsatisfactory, for it requires the use of an internal tubular support or nipple for insertion within adjoining ends of the pipe sections. Any such internal support constricts the internal diameter of the pipe and therefore reduces the flow therethrough. Moreover, the degree to which such a clamp is tightened on the pipe section depends upon human discretion, which, if poorly estimated, can result in a defective seal or joint.

Another very important advantage of the present invention is in the provision of a means of joinder of plastic conduit sections which prevents deformation or distortion from coaxial alignment thereof. This provision is effected by means of a longitudinal re-inforcement built into the coupler member employed in the joinder of pipe sections.

Other objects of the present invention will become apparent upon reading the following specification and referring to the accompanying drawings in which similar characters of reference represent corresponding parts in each of the several views.

Figure 1:
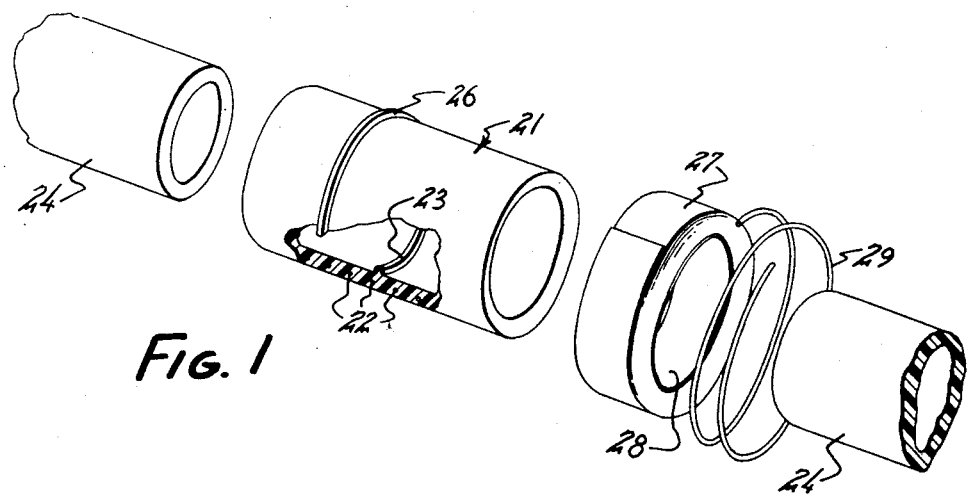
Fig. 1 is an exploded perspective view of a preferred embodiment of the invention.

Turning first to a preferred embodiment of the invention shown in Figs. 1–4, inclusive, there is provided a tubular coupler 21 in the shape of a sleeve. The illustrated coupler 21 may be manufactured of a thermoplastic or organic resinous material which will soften and become molten upon the application of heat. Polyethylene plastic material is particularly suitable for the construction of the coupler, although it has been demonstrated that other heat fusible or thermoplastic materials may be employed. Embedded in coupler 21 is an annular longitudinal stiffener or reinforcement 22 which supports the coupler when in plastic condition. For convenience in manufacture and assembly, member 22 may be made in the form of a split sleeve as indicated at 30 in Fig. 4 and, as illustrated herein, is made of metal wire mesh, such as window screen or other light gauge mesh. Mesh or screen material is particularly suitable, inasmuch as the thermoplastic coupler sleeve may expand initially and primarily outwardly through the interstices when in molten condition, which, as above noted, is an important feature of the invention.

Member 22 serves the essential function of maintaining the tubular shape of the coupler and meeting pipe sections and prevents collapse of the coupler and pipe ends when in softened or molten condition.

The re-inforcing member 22 serves a further very important purpose of supporting and maintaining the ends of the pipes to be joined in proper coaxial alignment and prevents effectively the pipes from becoming ruptured and dislocated in respect to the molten portions of the pipe at the time of application of external heat as will be hereinafter described. Many plastic pipes including polyethylene pipes come in coil and it is to counter-act this tendency to recoil that this aspect of the invention is particularly directed though it has other obvious advantages in the support of the molten pipe portion in respect to the unheated portions of the pipe to thus counteract any tendency of distortion occasioned by either internal or external application of force to the pipe lengths. In this connection, reinforcing member 22 is at least coextensive in length, and preferably somewhat longer, to the area of the coupler sleeve and conduit sections which will be subject to thermal softening or weakening whereby the conduit joint connection will be rigidly supported at all times.

Glass fabrics, ceramics, high melting point plastics, non-woven wire meshes, or perforated metals are a few examples of other longitudinal re-inforcements which may be used successfully as a re-inforcing element in combination with the coupler 21, preferably embedded therein.

A further feature of reinforcement 22 is that it limits unrestricted outward swelling or flow of the molten plastic sufficiently to cause adequate internal pressure of the coupler material around the conduit sections to ensure proper fusion of or bond between the coupler to the conduit sections.

Coupler 21 is preferably provided with an internal stop or rib 23 at approximately its midsection, which rib is of a height equal or less than the wall thickness of the conduit sections 24 with which the coupler is employed. The internal rib 23 serves as a means for locating the inner ends of conduit sections 24 to which the coupler is applied immediately below the point of application of heat. Accordingly, when the assembly of the sections is accomplished, the ends of conduits 24 are slidably inserted into coupler 21 from opposite ends thereof until they abut rib 23 whereat the adjoining ends of the conduits are properly aligned with the heat source.

Coupler 21 is also preferably formed with an external rib 26 which functions to locate the fuel element 27 accurately in position relative to the desired point of joint fusion. Thus, with conduit sections 24 abutting internal rib 23 and the fuel element 27 in close proximity or abutting external rib 26, the parts are accurately positioned relative to one another and proper fusion of the joint is accomplished.

Immediately surrounding coupler 21 is a protective layer of material such as aluminum foil 28 which, in the example given, may be of about four mil gauge. Foil 28 serves mechanically to separate fuel 27 from coupler 21 and thereby prevents charring of the coupler when the fuel burns. Foil 28 also helps insure uniform heating throughout the circumference of coupler 21. In practice the foil is formed as a part of the fuel element and constitutes the inner layer or lamination thereof.

Fuel element 27 may consist of helically wrapped straw paper or the like impregnated with potassium nitrate. A desirable fuel has been found to consist of about 15 wraps of nine mil straw paper impregnated with potassium nitrate and having a binder of dextrin or starch adhesive. In order to keep the fuel from unwrapping and to hold it firmly against metal foil 28, a short coil of several turns of metal wire 29 may be placed around fuel 27. In the broader aspects of the invention the heating of coupler 21 may be accomplished by an electric resistance heating element which may be wrapped or otherwise embraced around the coupler.

Figure 2:
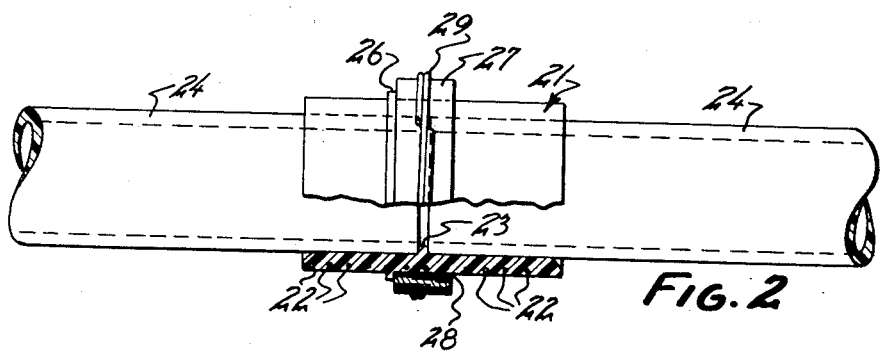
Fig. 2 is a side elevation partly broken away in section of the embodiment of Fig. 1 shown installed on two sections of conduit and showing the parts assembled prior to ignition.
Figure 4:
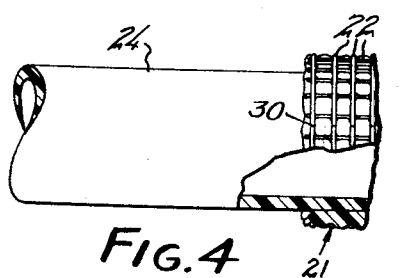
Fig. 4 is a view similar to Fig. 3 and showing the parts broken away and illustrating the split reinforcing means.
Figure 3:
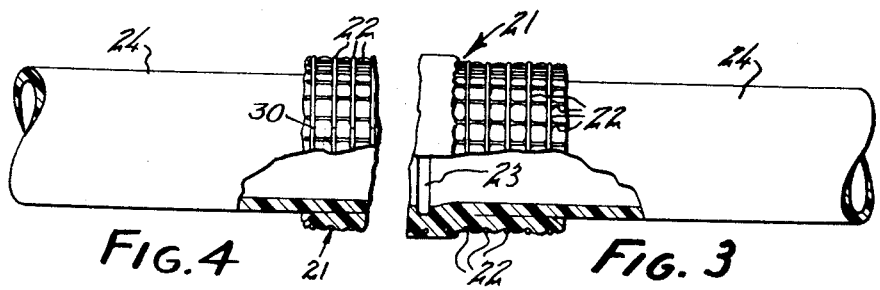
Fig. 3 is a view similar to Fig. 2 showing the parts after ignition and fusion of the joint and partly broken away to show the reinforcing means.

In operation, the parts are assembled as heretofore described and as illustrated in Fig. 2. In a typical example employing ¾" polyethylene pipe, fuel 27 is ignited (as by touching a rough-cut side edge of the fuel element with a common match) and burns initially for perhaps 30–60 seconds at a temperature of the order of 1200° F. and then smoulders for several minutes at perhaps 500–600° F. If an electric heating element is used in place of the fuel, heat generation and transfer may be accomplished by any number of various means available within the skill of the art and not here per se claimed as a part of the present invention. As above noted, foil 28 protects coupler 21 from charring because of direct contact with the fuel and also ensures uniform transfer of heat around the circumference of the coupler.

The fuel element and associated parts 28 and 29 serve to restrict or confine outward expansion of the molten material thereby enhancing fusion of the connected parts by exertion of compressive forces between pipes and coupler at the point of critical joinder.

Heat transfer from the burning fuel is directed from exteriorly of the coupler sleeve inwardly. The outer portions of the sleeve will thus be heated and become molten and expand before the inner portions of the sleeve are heated sufficiently to become molten and expand. Hence the initial and major expansion of the plastic material will be directed outwardly through the interstices of mesh reinforcement 22. As heat is transferred progressively inwardly there will also occur some inward expansion of swelling of the coupler material. However, this is desirable because it causes the molten coupler material to exert pressure around the conduit sections and this ensures good fusion between coupler and conduits. Occasionally there will be observed a temporary diametral restriction of the conduits due to the inward swelling of the conduit material itself under influence of heat. Upon cooling, however, the material will contract and return to its normal tubular diameter.

From the foregoing it is appreciated that the major flow of the plastic coupler is outward and there is no substantial permanent blocking or diminution of passageway through conduits 24. Reinforcement 22 prevents sagging or collapse of the joint and maintains the pipes co-axial with each other and the coupler during the time that the plastic material of the coupler and conduits are in softened or molten condition.

The fuses 27 and associated foil liner 28 act in concert as a heat reservoir.

Although the invention has been explained with particular reference to polyethylene, it is contemplated that the broader principles of the invention may be adapted to other types of organic resinous materials, such as polyvinyl chloride, as well the non-organic thermoplastics, such as metals. Obviously the type of thermoplastic coupler material employed would necessarily be related to the type and constituents of the conduit sections to be joined. An essential feature would be that the coupler have an affinity to fuse or bond with the conduit sections upon application of sufficient heat to the coupler. In any application involving the underlying principles of the present invention, means substantially equivalent in function to annular reinforcement sleeve 22 described with reference to Figs. 1–4 would be provided to furnish rigid support to the conduit joint connection especially during the time the coupler and/or the conduits are in a thermal-softened or molten condition. Additionally, in any application within the scope of preferred practice of the invention, heat would be transferred in an inward direction from the exterior of the conduit coupler with provision made to permit initial and primary outward expansion of the thermoplastic coupler material as it becomes molten and expands. On the other hand, and as also particularly explained in connection with the preferred practice of the invention, provision is also made to prevent restricted outward flow or expansion of the coupler whereby sufficient internal pressures of the coupler around the conduit sections are created to ensure fluid-tight bond or fusion between said coupler and the conduits.

Although the foregoing invention has been described in some detail by way of illustration and example for purposes of clarity of understanding, it is understood that certain changes and modifications may be practiced within the spirit of the invention and scope of the appended claims.

What is claimed is:

1. A method of coupling adjacent ends of two conduit sections together in end to end relation comprising the steps of circumferentially positioning around adjoining end portions of said two conduits to be joined together a thermoplastic coupling material arranged to circumferentially overlie said adjacent ends and characterized by its tendency to expand in volume and flow upon application of heat and having a thermal bond affinity to the material from which the conduit sections are made; applying heat from an external source to said thermoplastic material adjacent the meeting ends of said conduits and causing progressive heat transfer to occur in an inward direction through said material to cause said material to correspondingly progressively soften and flow, during said progressive heating transfer allowing said thermoplastic material to initially and primarily expand outwardly while inhibiting unrestricted outward expansion and flow of said material sufficiently to generate internal bonding pressure between said flowable material and said conduit sections; and during the cycle of said progressive heat transfer and while said material is in a thermally soft condition reinforcing and supporting said conduit sections throughout substantially the length of the coupling connection to prevent substantial deformation or collapse of said conduit sections while leaving substantial portions of said thermoplastic material overlying said conduit ends unconfined externally.

2. Means for coupling adjoining ends of two conduit sections, comprising: an open-ended sleeve made of thermoplastic material of the type adapted to soften and flow and expand in volume upon application of heat; said sleeve having an inside diameter proportioned to snugly slidably receive and circumferentially embrace adjacent end portions of conduit sections to be joined together; annular rigid reinforcing means encircling said sleeve material and in intimate contact and substantially coextensive therewith; and an external heat source for applying heat externally of and circumferentially around said sleeve to cause progressive heat transfer in an inward direction through said sleeve and to cause said sleeve material to soften and flow into contact with adjoining conduit end portions; said reinforcing means being perforate, at least substantial portions of said sleeve being unconfined externally except by said reinforcing means whereby to allow said sleeve material to expand initially and primarily outwardly while inhibiting unrestricted outward flow of said material to generate internal bonding pressure between said flowable sleeve material and said conduit sections.

3. The combination of claim 2 and wherein said external heat source comprises an annular combustible fuel element mounted circumferentially around said sleeve in approximate alignment with the adjoining end portions of the conduits received within said sleeve; and means comprising heat conductive material interposed between said fuel element and said sleeve mechanically separating said fuel element from said sleeve to transfer heat from said fuel to said sleeve and to prevent charring of the latter by the former.

4. The combination according to claim 2 and wherein said sleeve is formed with an internal annular locating rib against opposite sides of which may be abutted adjacent ends of the conduit sections to be joined.

5. The combination of claim 2 and wherein said sleeve is formed with an internal locating rib against which adjoining ends of the conduit sections to be joined may be abutted; said fuel source comprising an annular element of combustible fuel material mounted circumferentially around said sleeve in substantially coplanar alignment with said internal locating sleeve; said sleeve also formed with an external locating annular shoulder disposed laterally offset from said internal rib and located adjacent one side of said fuel element for locating said fuel element in coplanar alignment relative to said internal locating rib and relative to conduit sections abutting said internal rib.

6. Means for coupling adjoining ends of two conduit sections comprising: an open-ended sleeve made of thermoplastic material of the type adapted to soften and flow and expand in volume upon application of heat; said sleeve having an inside diameter proportioned to snugly slidably receive and circumferentially embrace adjacent end portions of conduit sections to be joined; annular reinforcing means encircling said sleeve material and in intimate contact therewith; an external heat source for applying heat externally of and circumferentially around said sleeve to cause progressive heat transfer in an inward direction through said sleeve and to cause said sleeve material to flow into contact with and fuse to adjoining conduit end portions; said annular reinforcing means comprising a tubular length of perforate material, at least substantial portions of said sleeve being unconfined externally except by said reinforcing means whereby said perforations allow initial and primary outward flow of said material while inhibiting unrestricted outward flow of said material to generate bonding pressure between said flowable material and said conduit sections.

7. The combination of claim 6 and wherein said annular reinforcing means comprises a split sleeve of relatively fine wire mesh, and wherein said perforations are defined by the interstices of said wire mesh.

8. In a pipe connection the combination including a pair of thermoplastic conduits, a thermoplastic sleeve open at its end to snugly receive said conduits, said sleeve formed with an interior centrally reduced diameter defining stop means to position the received conduits when abutted thereagainst, heat means carried exteriorly of said sleeve to apply heat thereto and overlying said stop means and abutting ends to cause said sleeve to become molten, means carried exteriorly of said sleeve to align said heat means in said overlying relation, and a reinforcing sleeve circumscribing said sleeve and substantially coextensive with the length of said sleeve to reinforce said connection against collapse or axial misalignment when molten, said reinforcing sleeve being perforate and at least substantial portions of said thermoplastic sleeve being unconfined externally except by said reinforcing sleeve whereby to allow initial and primary outward flow of said sleeve while inhibiting unrestricted outward flow of said sleeve to generate bonding pressure between said sleeve and said conduits.

9. The combination of claim 8 and wherein a heat conductive protective shield is interposed between said sleeve and reinforcing sleeve to prevent charring of the former and serve as a heat reservoir.

10. Means for coupling adjoining ends of two conduit sections comprising: an open-ended sleeve made of thermoplastic material of the type adapted to soften and flow and expand in volume upon application of heat; said sleeve having an inside diameter proportioned to snugly slidably receive and circumferentially embrace adjacent end portions of conduit sections to be joined; annular reinforcing means encircling said sleeve material and in intimate contact therewith; and an external heat source for applying heat externally of and circumferentially around said sleeve to cause progressive heat transfer in an inward direction through said sleeve and to cause said sleeve material to flow into contact with and fuse to adjoining conduit end portions; said annular reinforcing means comprising a tubular length of perforate material, at least substantial portions of said sleeve being unconfined externally except by said reinforcing means whereby said perforations allow initial and primary outward flow of said material while inhibiting unrestricted outward flow of said material to generate bonding pressure between said flowable material and said conduit sections, said reinforcing means formed of heat conductive material.

11. A pipe coupling comprising an open-ended sleeve formed of thermoplastic material of the type adapted to soften and flow and expand in volume upon application of heat, said sleeve having an inside diameter proportioned to snugly slidably receive and circumferentially embrace the end of a thermoplastic pipe, annular reinforcing means encircling said sleeve and in intimate contact therewith, an external heat source for applying heat externally of and circumferentially around said sleeve to cause progressive heat transfer in an inward direction through said sleeve and to cause said sleeve material to flow into contact with and fuse to the end portion of said pipe, said annular reinforcing means comprising a tubular length of perforate material, at least substantial portions of said sleeve being unconfined externally except by said reinforcing means whereby said perforations allow initial and primary outward flow of said material while inhibiting unrestricted outward flow of said material to generate bonding pressure between said flowable material and said pipe.

References Cited in the file of this patent

UNITED STATES PATENTS

| | | |
|---|---|---|
| Re. 13,219 | Chapman | Mar. 21, 1911 |
| 1,158,284 | Raflovich | Oct. 16, 1915 |
| 2,018,117 | Birk | Oct. 22, 1935 |
| 2,079,826 | Van Cleef | May 11, 1937 |
| 2,118,893 | Meerbeck | May 31, 1938 |
| 2,569,956 | Schiltknecht | Oct. 2, 1951 |
| 2,667,865 | Herman | Feb. 2, 1954 |
| 2,686,337 | Kaufman | Aug. 17, 1954 |
| 2,707,161 | Stern | Apr. 26, 1955 |
| 2,739,829 | Pedlow et al. | Mar. 27, 1956 |
| 2,745,368 | Klein | May 15, 1956 |

FOREIGN PATENTS

| | | |
|---|---|---|
| 26,644 | Great Britain | Dec. 16, 1898 |
| 1,115,103 | France | Dec. 26, 1955 |
| 209,804 | Australia | July 29, 1957 |